(12) United States Patent
Sopanen et al.

(10) Patent No.: US 11,329,530 B2
(45) Date of Patent: May 10, 2022

(54) ELECTRIC MACHINE SYSTEM

(71) Applicant: Lappeenrannan-Lahden teknillinen yliopisto LUT, Lappeenranta (FI)

(72) Inventors: Jussi Sopanen, Lappeenranta (FI); Olli Pyrhönen, Lappeenranta (FI)

(73) Assignee: LAPPEENRANNAN-LAHDEN TEKNILLINEN YLIOPISTO LUT, Lappeenranta (FI)

( * ) Notice: Subject to any disclaimer, the term of this patent is extended or adjusted under 35 U.S.C. 154(b) by 212 days.

(21) Appl. No.: 16/627,051

(22) PCT Filed: May 31, 2018

(86) PCT No.: PCT/FI2018/050411
§ 371 (c)(1),
(2) Date: Dec. 27, 2019

(87) PCT Pub. No.: WO2019/002663
PCT Pub. Date: Jan. 3, 2019

(65) Prior Publication Data
US 2020/0227974 A1    Jul. 16, 2020

(30) Foreign Application Priority Data
Jun. 30, 2017    (FI) ..................................... 20175638

(51) Int. Cl.
*H02K 7/09* (2006.01)
*H02K 11/21* (2016.01)
(Continued)

(52) U.S. Cl.
CPC .............. *H02K 7/09* (2013.01); *F16C 32/044* (2013.01); *H02K 5/24* (2013.01); *H02K 11/21* (2016.01); *H02K 2207/03* (2013.01)

(58) Field of Classification Search
CPC .............. F16C 32/0485; F16C 32/0474; F16C 32/0446; F16C 2360/44; F16C 2380/26;
(Continued)

(56) References Cited

U.S. PATENT DOCUMENTS 4,141,604 A * 2/1979 Habermann .......... F04D 29/053
310/90.5
7,893,573 B2   2/2011 Markert et al.
(Continued)

FOREIGN PATENT DOCUMENTS

CN    201196214 Y    2/2009
CN    201563017 U    8/2010
(Continued)

OTHER PUBLICATIONS

International Search Report, dated Jul. 30, 2018, from corresponding PCT application No. PCT/FI2018/050411.
(Continued)

*Primary Examiner* — Ahmed Elnakib
(74) *Attorney, Agent, or Firm* — Nixon & Vanderhye

(57) ABSTRACT

An electric machine includes a stator and a rotor. The stator includes a frame structure and an electromagnetically active part inside the frame structure. The rotor includes a shaft and an electromagnetically active part for producing torque in co-operation with the electromagnetically active part of the stator. The electric machine includes bearings inside the frame structure and arranged to support the rotor rotatably with respect to the stator. A magnetic bearing module for supporting the shaft is attached to an outer surface of the frame structure so that the frame structure and the magnetic bearing module are axially successive. The magnetic bearing module is a replaceable component which is non-destructively detachable from the frame structure. Thus, the
(Continued)

electric machine can be adapted to different mechanical loads by selecting a suitable magnetic bearing module.

14 Claims, 3 Drawing Sheets

(51) Int. Cl.
  *F16C 32/04* (2006.01)
  *H02K 5/24* (2006.01)

(58) Field of Classification Search
  CPC .................. F16C 37/005; F16C 32/047; F16C 32/0493; F16C 32/044; F16C 32/0406; H02K 11/0141; H02K 11/21; H02K 7/09; H02K 9/16; H02K 9/18; H02K 5/24; H02K 2207/03; H02K 2213/12; H02K 7/04; F04D 29/058
  USPC ........................................................ 310/90.5
  See application file for complete search history.

(56) References Cited

U.S. PATENT DOCUMENTS

| | | |
|---|---|---|
| 2011/0316376 A1 | 12/2011 | Sortore et al. |
| 2013/0170943 A1 | 7/2013 | Jonsson et al. |
| 2014/0354098 A1 | 12/2014 | Krebs et al. |
| 2015/0244239 A1* | 8/2015 | Carrasco .................. H02K 9/19 310/54 |
| 2016/0186764 A1 | 6/2016 | Lissoni et al. |

FOREIGN PATENT DOCUMENTS

| | | | |
|---|---|---|---|
| JP | H04-300417 A | | 10/1992 |
| JP | H09-308185 A | | 11/1997 |
| JP | H11-324970 A | | 11/1999 |
| JP | 3820479 | * | 9/2006 |
| JP | 2008-072811 A | | 3/2008 |
| JP | 2015-159717 A | | 9/2015 |
| WO | WO 03021748 | * | 3/2003 |
| WO | 2014/193238 A1 | | 12/2014 |
| WO | 2016/087303 A1 | | 6/2016 |

OTHER PUBLICATIONS

Finnish Search Report, dated Jan. 25, 2018, from corresponding Finnish application No. 20175638.

Office Action issued in Chinese Patent Application No. 201880043886.4 dated Sep. 1, 2021.

Office Action issued in Japanese Patent Application No. 2019-572153 dated Mar. 1, 2022.

* cited by examiner

ELECTRIC MACHINE SYSTEM

FIELD OF THE DISCLOSURE

The disclosure relates generally to rotating electric machines. More particularly, the disclosure relates to an electric machine system that can be adapted to different mechanical loads. Furthermore, the disclosure relates to a product set for implementing an electric drive.

BACKGROUND

In an electric drive where an electric machine is connected to a working machine, the working machine may direct static and/or time varying axial and/or radial forces to the shaft of the electric machine. The working machine can be for example a compressor, a turbine, a pump, or some other mechanical device which is run by an electric motor or which runs an electric generator. The above-mentioned axial and/or radial forces directed to the shaft of the electric machine are dependent on properties of the working machine. Therefore, different working machines having a same mechanical power may direct significantly different radial and/or axial forces to the shaft of a connected electric machine. Thus, the bearings of an electric machine need to be suitable for carrying different static and/or time varying radial and/or axial forces in order that the electric machine would be compatible with different working machines.

The above-mentioned requirement may be challenging in conjunction with electric machines which comprise magnetic bearings. Especially in high-speed applications, an electric machine having a sufficient power for different working machines is typically not directly suitable for running each of these working machines because there may be significant differences between these working machines regarding to static and/or time varying axial and/or radial forces directed to the shaft of the electric machine. Therefore, there is often a need for full integration of a working machine and a high-speed electric machine provided with magnetic bearings. Such a full integration can be difficult, and a need for the full integration can be even a show stopper for wider application of the magnetic bearing technology in the market.

SUMMARY

The following presents a simplified summary in order to provide a basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

In accordance with the invention, there is provided a new electric machine system that can act as a motor or as a generator. An electric machine system according to the invention comprises an electric machine that comprises:
- a stator comprising a frame structure and an electromagnetically active part inside the frame structure,
- a rotor comprising a shaft and an electromagnetically active part for producing torque in co-operation with the electromagnetically active part of the stator, and
- bearings for supporting the rotor rotatably with respect to the stator, the bearings being inside the frame structure.

The electric machine system further comprises a magnetic bearing module arranged to support the shaft and attached to an outer surface of the frame structure so that the frame structure and the magnetic bearing module are axially successive. The magnetic bearing module is a replaceable component which is non-destructively detachable from the frame structure. Thus, the electric machine can be adapted to different working machines by selecting a suitable magnetic bearing module. The above-mentioned bearings of the electric machine may comprise for example magnetic bearings. It is however also possible that a magnetic bearing module of the kind mentioned above is used for adapting an electric machine having bearings other than magnetic bearings, e.g. gas bearings, to be compatible with a working machine.

In accordance with the invention, there is provided also a new product set for implementing an electric drive. A product set according to the invention comprises an electric machine that comprises:
- a stator comprising a frame structure and an electromagnetically active part inside the frame structure,
- a rotor comprising a shaft and an electromagnetically active part for producing torque in co-operation with the electromagnetically active part of the stator, and
- bearings for supporting the rotor rotatably with respect to the stator, the bearings being inside the frame structure.

The product set further comprises:
- a first magnetic bearing module for supporting the shaft and attachable to an outer surface of the above-mentioned frame structure so that the frame structure and the magnetic bearing module are axially successive and non-destructively detachable from each other, and
- at least one second magnetic bearing module for supporting the shaft and attachable to a same place on the outer surface of the frame structure as the first magnetic bearing module so that the frame structure and the second magnetic bearing module are axially successive and non-destructively detachable from each other, the second magnetic bearing module having force-generating magnetic elements dimensioned differently than corresponding force-generating magnetic elements of the first magnetic bearing module.

Exemplifying and non-limiting embodiments of the invention are described in accompanied dependent claims.

Various exemplifying and non-limiting embodiments of the invention both as to constructions and to methods of operation, together with additional objects and advantages thereof, will be best understood from the following description of specific exemplifying and non-limiting embodiments when read in connection with the accompanying drawings.

The verbs "to comprise" and "to include" are used in this document as open limitations that neither exclude nor require the existence of unrecited features. The features recited in dependent claims are mutually freely combinable unless otherwise explicitly stated. Furthermore, it is to be understood that the use of "a" or "an", i.e. a singular form, throughout this document does not exclude a plurality.

BRIEF DESCRIPTION OF THE FIGURES

Exemplifying and non-limiting embodiments of the invention and their advantages are explained in greater detail below in the sense of examples and with reference to the accompanying drawings, in which.

DESCRIPTION OF EXEMPLIFYING AND NON-LIMITING EMBODIMENTS

The specific examples provided in the description below should not be construed as limiting the scope and/or the applicability of the accompanied claims. Lists and groups of examples provided in the description are not exhaustive unless otherwise explicitly stated.

Figure 1:
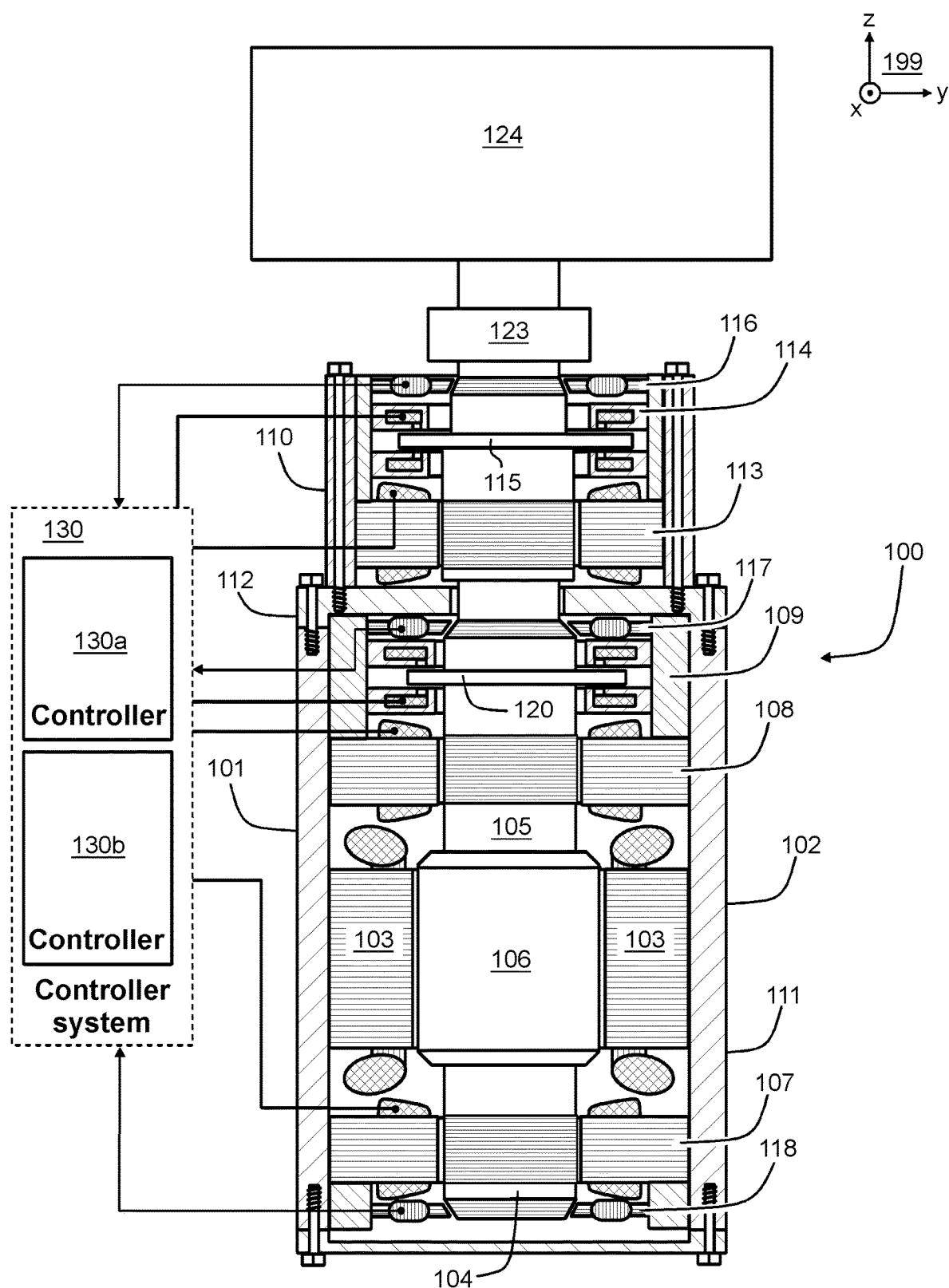
FIG. 1 illustrates an electric machine system according to an exemplifying and non-limiting embodiment of the invention.

FIG. 1 shows a schematic section view of an electric machine system according to an exemplifying and non-limiting embodiment of the invention. The section plane is parallel with the yz-plane of a coordinate system 199. The electric machine system comprises an electric machine 100 that comprises a stator 101 and a rotor 104. The stator 101 comprises a frame structure 102 and an electromagnetically active part 103 inside the frame structure 102. The electromagnetically active part 103 may comprise for example a ferromagnetic core structure and multiphase windings installed in slots of the ferromagnetic core structure. The rotor 104 comprises a shaft 105 and an electromagnetically active part 106 for producing torque in co-operation with the electromagnetically active part 103 of the stator. The electromagnetically active part 106 of the rotor 104 may comprise for example permanent magnets, wound windings, a cage winding and/or other electrically conductive structures, and/or ferromagnetic structures providing saliency. Thus, the electric machine 100 can be for example an electrically excited synchronous machine, a permanent magnet machine, an induction machine, or a reluctance machine. In the exemplifying situation shown in FIG. 1, the shaft 105 of the electric machine 100 is coupled to a working machine 124 with the aid of a coupling 123. The working machine 124 can be for example a compressor, a turbine, a pump, or some other mechanical device which is run by the electric machine 100 when the electric machine acts as a motor or which runs the electric machine 100 when the electric machine acts as a generator.

The electric machine 100 comprises bearings 107, 108, and 109 which are located inside the frame structure 102 of the stator 101. The bearings 107-109 are arranged to support the rotor 104 rotatably with respect to the stator 101. In this exemplifying electric machine 100, the bearings 107 and 108 are radial magnetic bearings which are located, in the axial direction, on opposite sides of the electromagnetically active part 106 of the rotor. The bearing 109 is an axial magnetic bearing that comprises a rotor-disc 120. The electric machine 100 further comprises position sensors 117 and 118 for producing position signals which are indicative of the position of the rotor 104 with respect to a reference position in axial and radial directions. The axial direction is parallel with the z-axis of the coordinate system 199. It is also possible that an electric machine of an electric machine system according to an exemplifying and non-limiting embodiment comprises magnetic bearings different from those illustrated in FIG. 1. The magnetic bearings may comprise for example conical magnetic bearings. The electric machine 100 advantageously further comprises touchdown bearings, e.g. ball or sliding bearings, for carrying the rotor in a case of failure of the magnetic bearings. The touchdown bearings are not shown in FIG. 1. Furthermore, it is also possible that an electric machine of an electric machine system according to an exemplifying and non-limiting embodiment comprises some other bearings than magnetic bearings, e.g. gas bearings.

The electric machine system further comprises a magnetic bearing module 110 which is arranged to support the shaft 105 and attached to an outer surface of the frame structure 102 of the electric machine 100 so that the frame structure and the magnetic bearing module are axially successive. The magnetic bearing module 110 is a replaceable component which is non-destructively detachable from the frame structure 102. Thus, the electric machine 100 can be adapted to different working machines by selecting a suitable magnetic bearing module. The magnetic bearing module 110 may comprise one or more touchdown bearings, e.g. ball or sliding bearings, for carrying the shaft in a case of failure of the magnetic bearings of the magnetic bearing module 110. The touchdown bearings are not shown in FIG. 1. In the exemplifying electric machine 100, the frame structure 102 comprises a tubular part 111 surrounding the electromagnetically active part 103 of the stator and an end-shield 112 attached to the tubular part and having an aperture for the shaft 105. As illustrated in FIG. 1, the magnetic bearing module 110 is attached to the end-shield 112.

In the exemplifying electric machine system illustrated in FIG. 1, the magnetic bearing module 110 comprises a radial magnetic bearing 113 and an axial magnetic bearing 114 having a rotor-disc 115. Furthermore, the magnetic bearing module 110 comprises a position sensor 116 for generating a position signal indicative of a radial position of the shaft with respect to a reference position fixed to the magnetic bearing module and/or an axial position of the shaft with respect to a reference position fixed to the magnetic bearing module.

An electric drive comprising the electric machine system shown in FIG. 1 comprises a controller system 130 for controlling the magnetic bearings 107-109, 113, and 114 based on the position signals produced by the position sensors 116, 117, and 118. The magnetic bearings of the magnetic bearing module 110 and the magnetic bearings of the electric machine 100 can be controlled according to a multivariable control so that there are connections between the levitation control loops of the magnetic bearing module 110 and the levitation control loops the electric machine 100. It is also possible that the magnetic bearing module 110 is controlled with its own levitation control loop which is separate from the levitation control loops of the electric machine 100. The magnetic bearings of the magnetic bearing module 110 and the magnetic bearings of the electric machine 100 are advantageously controlled in a coordinated way so as to avoid e.g. situations in which the radial and/or axial magnetic bearings of the magnetic bearing module 110 act against radial and/or axial magnetic bearings of the electric machine 100. In addition to bearing forces directed by the working machine 124 to the shaft 105, the magnetic bearing module 110 can be used for damping harmful vibrations of the shaft. The vibration damping can be done using a coordinated multivariable control for all the magnetic bearings or using a separate control for the magnetic bearing unit 110, if the control for the magnetic bearings 107-109 of the electric machine 100 should not be changed due the magnetic bearing unit 110. In FIG. 1, the exemplifying case where the magnetic bearing unit 110 is controlled separately from the control of the magnetic bearings 107-109 is illustrated with a first controller 130a for controlling the magnetic bearing unit 110 and a second controller 130b for controlling the magnetic bearings 107-109 of the electric machine 100.

The implementation of the controller system 130, i.e. the controllers 130a and 130b, can be based on one or more analogue circuits, one or more digital processing circuits, or a combination thereof. Each digital processing circuit can be a programmable processor circuit provided with appropriate software, a dedicated hardware processor such as for example an application specific integrated circuit "ASIC", or a configurable hardware processor such as for example a field programmable gate array "FPGA". Furthermore, the controller system 130, i.e. the controllers 130a and 130b, may comprise one or more memory circuits each of which can be for example a Random-Access Memory "RAM" circuit.

Figure 2A:
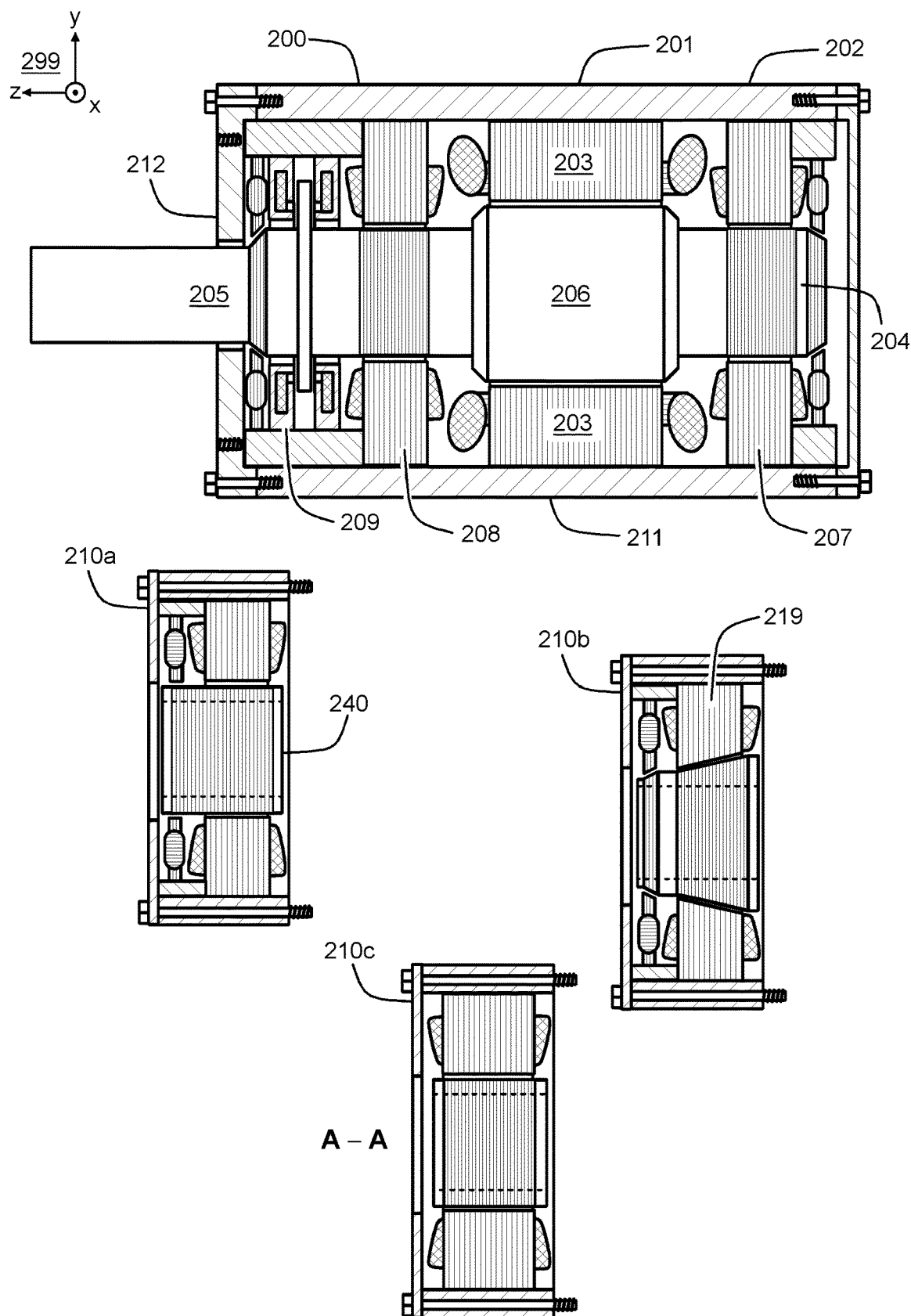
FIGS. 2a and 2b illustrate a product set according to an exemplifying and non-limiting embodiment of the invention for implementing an electric drive.

FIG. 2a illustrates a product set according to an exemplifying and non-limiting embodiment of the invention for implementing an electric drive. The product set comprises an electric machine 200 and magnetic bearing modules 210a, 210b, and 210c. Each of the magnetic bearing modules 210a-210c is attachable to the electric machine 200 so that the electric machine 200 and the magnetic bearing module are axially successive and non-destructively detachable from each other. In FIG. 2a, the electric machine 200 and the magnetic bearing modules 210a-210c are presented with schematic section views where a section plane is parallel with the yz-plane of a coordinate system 299. The electric machine 200 comprises a stator 201 and a rotor 204. The stator 201 comprises a frame structure 202 and an electromagnetically active part 203 inside the frame structure. The rotor 204 comprises a shaft 205 and an electromagnetically active part 206 for producing torque in co-operation with the electromagnetically active part 203 of the stator. The electric machine 200 comprises radial magnetic bearings 207 and 208 and an axial magnetic bearing 209 for supporting the rotor 204 rotatably with respect to the stator 201. The magnetic bearings 207-208 are located inside the frame structure 202. In this exemplifying case, the abovementioned frame structure 202 comprises a tubular part 211 surrounding the electromagnetically active part 203 of the stator and an end-shield 212 attached to the tubular part 211 and having an aperture for the shaft 205. Each of the magnetic bearing modules 210a-210c is attachable to the end-shield 212.

As illustrated in FIG. 2a, the magnetic bearing modules 210a-210c have different force-generating magnetic elements. Thus, the electric machine 200 can be adapted to different requirements by selecting a suitable one of the magnetic bearing modules 210a-210c. The magnetic bearing module 210a comprises a radial magnetic bearing and a position sensor for producing a position signal indicative of a radial position of the shaft 205 in the axial coverage area of the magnetic bearing module 210a. The position sensor can be for example an inductive sensor. Furthermore, the magnetic bearing module 210a comprises a rotor element 240 that can be assembled around the shaft 205 for example with a thermal interference fit. The rotor element 240 comprises advantageously a laminated portion constituted by electrically insulated ferromagnetic sheets which are stacked in the axial direction. Compared to solid steel, the laminated portion reduces eddy currents which would cause power losses and disturb the operation of the radial magnetic bearing as well as the operation of the inductive position sensor. The magnetic bearing module 210b comprises a conical magnetic bearing 219 and a position sensor for producing a position signal indicative of the radial position of the shaft 205 in the axial coverage area of the magnetic bearing module 210a and of the axial position of the shaft 205. The magnetic bearing module 210b is suitable for cases in which an external mechanical system directs a unidirectional axial force to the shaft 205. The magnetic bearing module 210c comprises a radial magnetic bearing which is axially longer than that of the magnetic bearing module 210a. The magnetic bearing module 210c does not comprise a position sensor, and it is assumed that a position signal produced by a position sensor of the electric machine 200 is utilized in the control of the magnetic bearing module 210c. It is worth noting that the magnetic bearing modules 210a-210c are mere examples and a product set according to an exemplifying embodiment of the invention may comprise magnetic bearing modules different from the magnetic bearing modules 210a-210c.

Figure 2B:
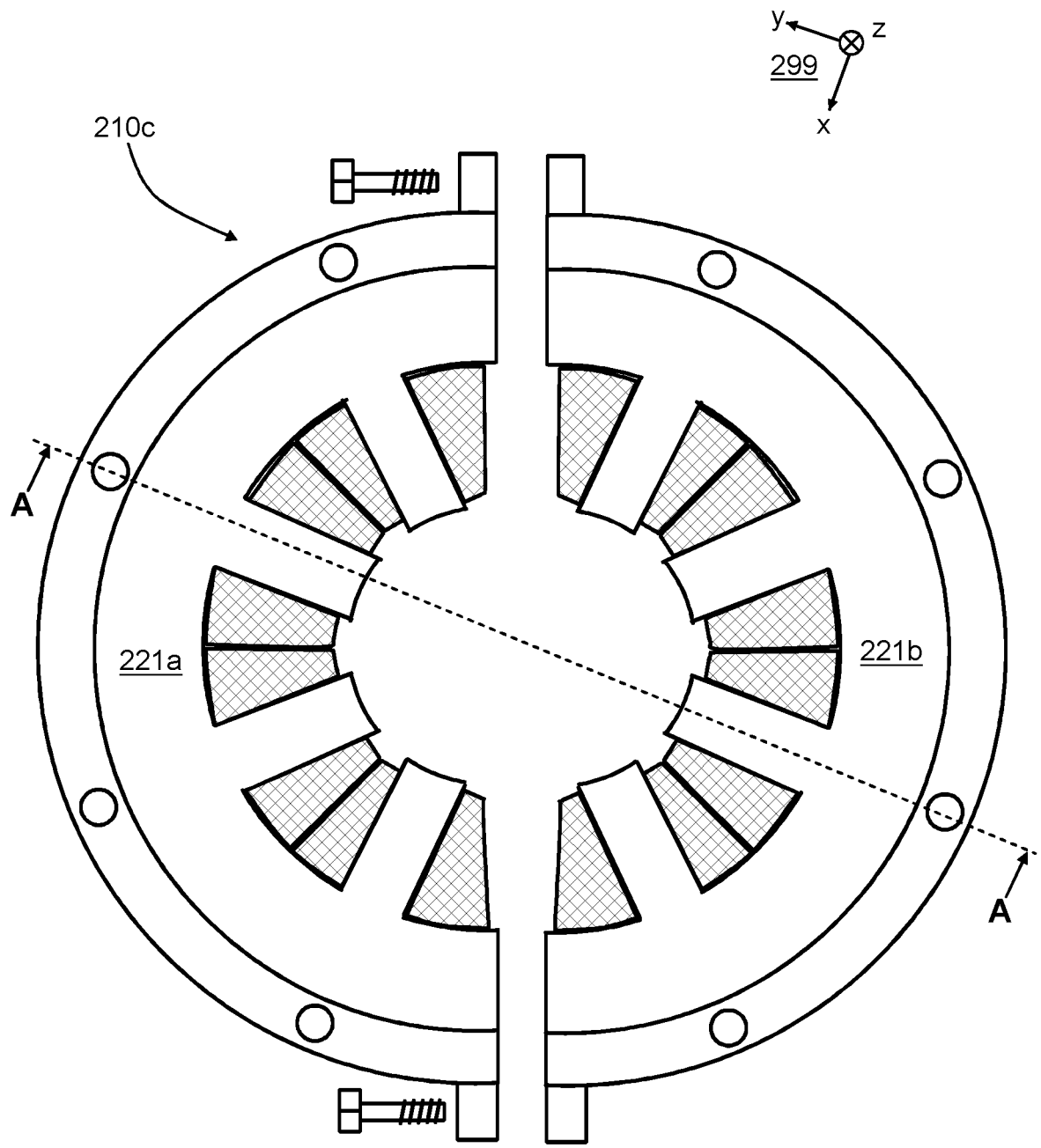

A magnetic bearing module of a product set according to an embodiment of the invention may have a stator part that comprises at least two sectors that are attachable to each other to surround a shaft. Thus, the stator part of the magnetic bearing module can be installed without a need for a free end of the shaft. In the product set illustrated in FIG. 2a, the magnetic bearing module 210c has a stator part that comprises two sectors that are attachable to each other to surround the shaft 205. FIG. 2b shows the magnetic bearing module 210c when seen along the positive z-direction of the coordinate system 299. In FIG. 2b, the sectors of the magnetic bearing module 210c are denoted with references 221a and 221b. The section plane relating to FIG. 2a is depicted with a dashed line A-A in FIG. 2b. Naturally, also the magnetic bearing modules 210a and 201b may have a sectored structure of the kind described above.

The specific examples provided in the description given above should not be construed as limiting the scope and/or the applicability of the appended claims. Lists and groups of examples provided in the description given above are not exhaustive unless otherwise explicitly stated.

What is claimed is:
1. An electric machine system comprising:
   an electric machine comprising
      a stator comprising a frame structure and an electromagnetically active part inside the frame structure,
      a rotor comprising a shaft and an electromagnetically active part configured to produce torque in cooperation with the electromagnetically active part of the stator, and
      first and second magnetic bearings configured to support the rotor rotatably with respect to the stator, the first and second magnetic bearings being inside the frame structure and disposed, in an axial direction, on opposite sides of the electromagnetically active part of the rotor;
   a magnetic bearing module configured to support the shaft and attached to an outer surface of the frame structure so that the frame structure and the magnetic bearing module are axially successive, the magnetic bearing module being a replaceable component which is non-destructively detachable from the frame structure;
   a first controller configured to control the magnetic bearing module to damp vibrations of the shaft; and
   a second controller configured to control the first and second magnetic bearings of the electric machine.
2. The electric machine system according to claim 1, wherein the frame structure comprises a tubular part surrounding the electromagnetically active part of the stator and an end-shield attached to the tubular part and having an aperture for the shaft, the magnetic bearing module being attached to the end-shield.

3. The electric machine system according to claim 1, wherein the magnetic bearing module comprises a radial magnetic bearing.

4. The electric machine system according to claim 1, wherein the magnetic bearing module comprises an axial magnetic bearing having a rotor-disc.

5. The electric machine system according to claim 1, wherein the magnetic bearing module comprises a conical magnetic bearing.

6. The electric machine system according to claim 1, wherein a stator part of the magnetic bearing module comprises at least two sectors attachable to each other to surround the shaft and enabling installation of the stator part of the magnetic bearing module without a free end of the shaft.

7. The electric machine system according to claim 1, wherein the magnetic bearing module comprises a position sensor configured to generate a position signal indicative of at least one of: a radial position of the shaft with respect to a radial reference position fixed to the magnetic bearing module, and an axial position of the shaft with respect to an axial reference position fixed to the magnetic bearing module.

8. A product set for implementing an electric drive, the product set comprising:
   an electric machine comprising
      a stator comprising a frame structure and an electromagnetically active part inside the frame structure,
      a rotor comprising a shaft and an electromagnetically active part configured to produce torque in cooperation with the electromagnetically active part of the stator, and
      bearings configured to support the rotor rotatably with respect to the stator, the bearings being inside the frame structure;
   a first magnetic bearing module configured to support the shaft and attachable to an outer surface of the frame structure so that the frame structure and the magnetic bearing module are axially successive and non-destructively detachable from each other; and
   at least one second magnetic bearing module configured to support the shaft and attachable to a same place on the outer surface of the frame structure as the first magnetic bearing module so that the frame structure and the second magnetic bearing module are axially successive and non-destructively detachable from each other, the second magnetic bearing module having force-generating magnetic elements dimensioned differently than corresponding force-generating magnetic elements of the first magnetic bearing module.

9. The product set according to claim 8, wherein the frame structure comprises a tubular part surrounding the electromagnetically active part of the stator and an end-shield (212) attached to the tubular part and having an aperture for the shaft, each of the first and second magnetic bearing modules being attachable to the end-shield.

10. The product set according to claim 8, wherein at least one of the magnetic bearing modules comprises a radial magnetic bearing.

11. The product set according to claim 8, wherein at least one of the magnetic bearing modules comprises an axial magnetic bearing having a rotor-disc.

12. The product set according to claim 8, wherein the at least one of the magnetic bearing modules comprises a conical magnetic bearing.

13. The product set according to claim 8, wherein a stator part of at least one of the magnetic bearing modules comprises at least two sectors attachable to each other to surround the shaft and enabling installation of the stator part of the magnetic bearing module without a free end of the shaft.

14. The product set according to claim 8, wherein at least one of the magnetic bearing modules comprises a position sensor configured to generate a position signal indicative of at least one of: a radial position of the shaft with respect to a radial reference position fixed to the magnetic bearing module, and an axial position of the shaft with respect to an axial reference position fixed to the magnetic bearing module.

* * * * *